United States Patent [19]

Sano et al.

[11] Patent Number: 4,725,073
[45] Date of Patent: Feb. 16, 1988

[54] TRAILING ARM SUSPENSION WITH PLURAL LINKS

[75] Inventors: Shoichi Sano; Yutaka Tashiro, both of Saitama, Japan

[73] Assignee: Honda Giken Kogyo Kabushiki Kaisha, Tokyo, Japan

[21] Appl. No.: 903,299

[22] Filed: Sep. 3, 1986

[30] Foreign Application Priority Data

Sep. 5, 1985 [JP] Japan ............... 60-197040

[51] Int. Cl.$^4$ .............................. B60G 3/18
[52] U.S. Cl. .................... 280/690; 280/701
[58] Field of Search ........... 280/95 R, 688, 690, 280/696, 701; 180/73.4

[56] References Cited

U.S. PATENT DOCUMENTS

| | | | |
|---|---|---|---|
| 2,580,558 | 1/1952 | Kolbe | 280/696 |
| 3,327,803 | 6/1967 | Cote et al. | 180/73.4 |
| 3,679,017 | 7/1972 | Roe | 280/701 |
| 4,453,733 | 6/1984 | Sautter et al. | 280/95 R |

FOREIGN PATENT DOCUMENTS 2822058 11/1979 Fed. Rep. of Germany ...... 280/690

Primary Examiner—John J. Love
Assistant Examiner—Ross Weaver
Attorney, Agent, or Firm—Irving M. Weiner; Joseph P. Carrier; Pamela S. Burt

[57] ABSTRACT

A trailing arm suspension includes a holder pivotally supported on a vehicle body by a first pivot shaft extending substantially longitudinally of the vehicle body and supporting a second pivot shaft extending substantially transversely of the vehicle body, a trailing arm pivotally supported by the second pivot shaft on the holder and having a spindle mounted on a rear portion thereof for rotatably supporting a wheel, and a plurality of links have first ends thereof coupled to the trailing arm and extending substantially transversely of the vehicle body. The point at which the trailing arm is pivotally supported by the second pivot shaft can easily be displaced transversely through swinging movement of the holder about the axis of the first pivot shaft. A rubber bushing interposed between the trailing arm and the second pivot shaft can be harder or higher in rubber rigidity in the longitudinal and vertical directions of the vehicle body for limiting changes in wheel alignment when wheels are driven or braked.

6 Claims, 3 Drawing Figures

TRAILING ARM SUSPENSION WITH PLURAL LINKS

BACKGROUND OF THE INVENTION

1. Field of the Invention

The present invention relates to a trailing arm suspension having a plurality of links.

2. Description of the Relevant Art

There are well known motor vehicle suspensions comprising a trailing arm pivotally supported on a vehicle body by a pivot shaft extending substantially transversely of the vehicle body and a plurality of links having first ends thereof connected to the vehicle body and opposite ends thereof to the trailing arm and extending substantially transversely of the vehicle body.

Such trailing arm suspensions with plural links are disclosed in U.S. Pat. No. 3,327,803, West German Patent Application No. 3043092.3, and Japanese Laid-Open Patent Publication No. 60(1985)-53408, for example.

In the suspension of the above type, a rubber bushing is interposed between the trailing arm and the pivot shaft. This rubber bushing is required to have various properties in order to enable the suspension to function properly. More specifically, the rubber bushing is required to be harder in the vertical direction of the vehicle body for reducing the effect of a braking torque thereon, and softer in the transverse direction of the vehicle body for preventing the trailing arm from being twisted and for limiting changes in wheel alignment.

However, it has been difficult to provide a single rubber bushing which meets the above different requirements.

SUMMARY OF THE INVENTION

It is an object of the present invention to provide a trailing arm suspension with plural links which allows the pivotally supported portion of a trailing arm to be easily movable transversely of a vehicle body even if a rubber bushing between the trailing arm and a pivot shaft therefor is harder or its rubber rigidity is higher in longitudinal and vertical directions of the vehicle body.

In an effort to meet the above requirements, there is provided, in accordance with the present invention, a trailing arm suspension comprising a holder pivotally supported on a vehicle body by a first pivot shaft extending substantially longitudinally of the vehicle body and supporting a second pivot shaft extending substantially transversely of the vehicle body, a trailing arm pivotally supported on the holder by the second pivot shaft and having a spindle mounted on a rear portion thereof for rotatably supporting a wheel, and a plurality of links having first ends thereof coupled to the trailing arm and extending substantially transversely of the vehicle body.

With the arrangement of the present invention, the second pivot shaft by which the trailing arm is pivotally supported is supported by the holder that is pivotally supported on the vehicle body by the first pivot shaft extending substantially longitudinally of the vehicle body. The point at which the trailing arm is pivotally supported can easily be displaced transversely through swinging movement of the holder about the axis of the first pivot shaft.

The above and further objects, details and advantages of the present invention will become apparent from the following detailed description of a preferred embodiment thereof, when read in conjunction with the accompanying accompanying drawings.

DETAILED DESCRIPTION OF THE PREFERRED EMBODIMENT

Figure 1:
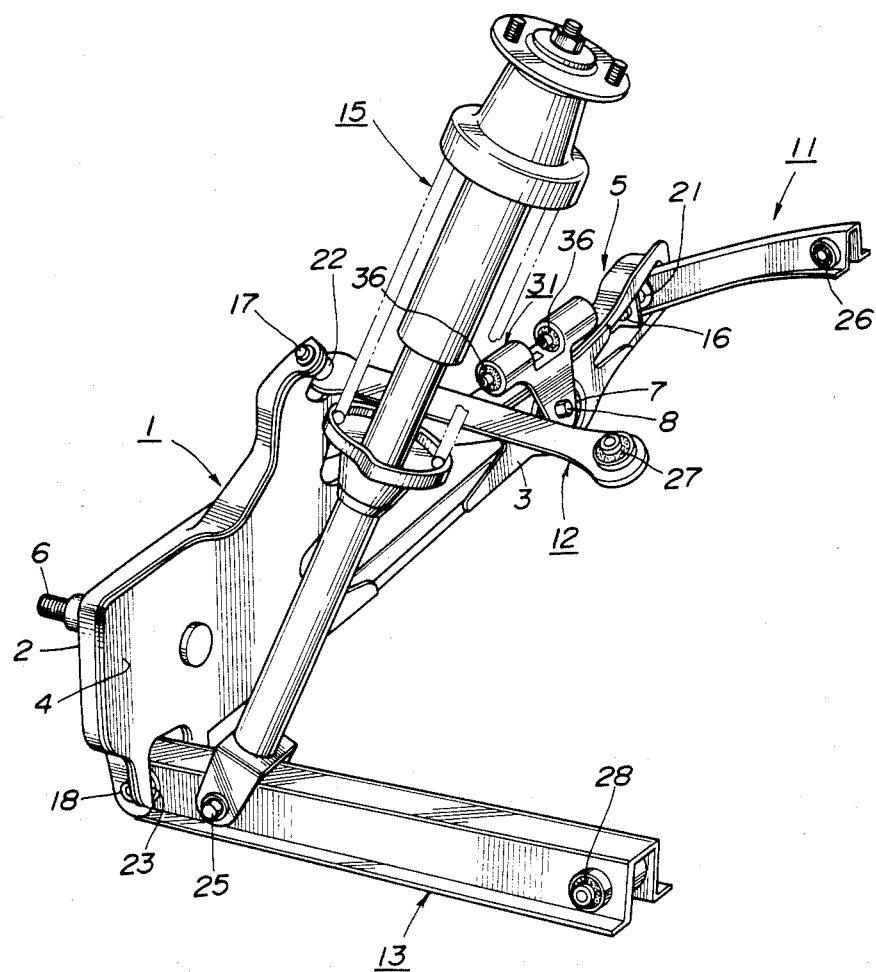
FIG. 1 is a perspective view of a trailing arm suspension according to the present invention.

FIG. 1 shows a trailing arm suspension according to the present invention, for use as a rear wheel suspension on a motor vehicle. The trailing arm suspension includes a trailing arm 1 comprising a rigid base plate 2 formed by pressing and extending in a longitudinal direction of the vehicle body (not shown) and reinforcing plates 3, 4 attached to the base plate 2 to stiffen the same. The base plate 2 has its plane extending vertically. An outwardly projecting spindle 6 on which a rear wheel (not shown) is to be supported is fixed to a rear portion of the base plate 2, and a rubber bushing 7 with a tube is fixed to a front portion of the base plate 2 extending from its center to a front end thereof.

The trailing arm suspension also includes three lateral links 11, 12, 13 extending substantially in a transverse direction of the vehicle body and pivotally coupled to the trailing arm 1 by support shafts 16, 17, 18, respectively, spaced substantially in the longitudinal direction of the vehicle body.

The trailing arm 1 has a front extension 5 lying forwardly of the rubber bushing 7. The first lateral link 11 has an outer end pivotally connected to the front extension 5 by means of a rubber bushing 21 having a tube. The trailing arm 1 also has front upper and rear lower portions to which outer ends of the respective second and third lateral links 12, 13 are pivotally coupled by means of rubber bushings 22, 23, respectively, having tubes.

A damper 15 has its lower end pivotally coupled by a support shaft 25 to the third lateral link 13 closely to its outer end. The first through third lateral links 11, 12, 13 have inner ends pivotally supported by respective rubber bushings 26, 27, 28 having tubes. The damper 15 has an upper end which is also coupled to the vehicle body.

The trailing arm 1 is pivotally supported on a holder 31 by means of a second pivot shaft 8 extending through the rubber bushing 7 on the front portion of the trailing arm 1.

Figure 2:
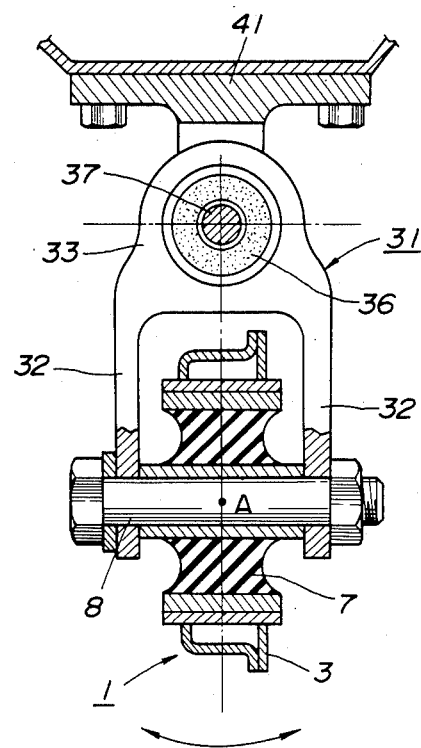
FIG. 2 is a rear elevational view, partly in cross section, of a holder of the trailing arm suspension shown in FIG. 1.
Figure 3:
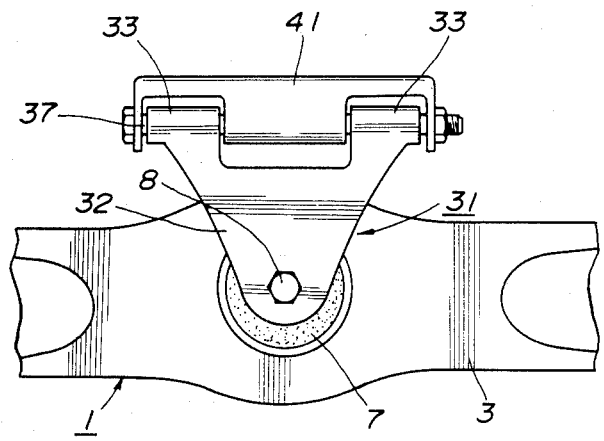
FIG. 3 is a side elevational view of the holder illustrated in FIG. 2.

As shown in FIGS. 2 and 3, the holder 31 comprises a pair of depending members 32 parallel to each other and extending substantially in the longitudinal direction of the vehicle body, and a pair of tubular members 33 extending parallel to the depending members 32 and interconnecting upper ends of the depending members 32. The tubular members 33 are concentric with each other in the longitudinal direction of the vehicle body. Rubber bushings 36 having tubes are fixedly mounted in the tubular members 33, respectively.

The rubber bushing 7 secured to the trailing arm 1 is disposed between the depending members 32 of the holder 31. The second pivot shaft 8 extends through the tube of the rubber bushing 7 so that the trailing arm 1 is pivotally supported on the holder 31 by the second pivot shaft 8. A first pivot shaft 37 extending substantially in the longitudinal direction of the vehicle body is inserted through the tubes of the rubber bushings 36 in the tubular members 33. Front and rear ends and an intermediate portion of the first pivot shaft 37 are supported by a bracket 41 secured to the vehicle body.

In this manner, the second pivot shaft 8 by which the trailing arm 1 is pivotally supported is supported by the holder 31 which is pivotally supported on the vehicle body by the longitudinally extending first pivot shaft 37. Any transverse movement of the trailing arm 1 due to swinging movement of the lateral links 11, 12, 13 as the wheel bounds and rebounds is facilitated by displacement of a pivotally supported point A of the trailing arm 1 through swinging movement of the holder 31 about the axis of the first pivot shaft 37, thereby limiting changes in wheel alignment.

The lateral displacement of the pivotally supported point A can easily be made even if the rubber bushing 7 interposed between the trailing arm 1 and the second pivot shaft 8 is harder in the transverse direction of the vehicle body.

With the above arrangement, therefore, the rubber bushing 7 can be harder or higher in rubber rigidity in the longitudinal and vertical directions of the vehicle body, and such higher rubber rigidity of the rubber bushing 7 is effective in limiting changes in wheel alignment when the wheels are driven or braked. Inasmuch as the rubber bushings 36 are interposed between the holder 31 and the first pivot shaft 37, rubber rigidity of the rubber bushings 7, 36 may also be increased, and the rubber bushings 7, 36 can provide such a degree of compliance as required for the suspension.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A trailing arm suspension comprising:
   a holder pivotally supported on a vehicle body by a first pivot shaft extending substantially longitudinally of the vehicle body and supporting a second pivot shaft extending substantially transversely of the vehicle body, said first and second pivot shafts being vertically remote from each other;
   a trailing arm pivotally supported on said holder by said second pivot shaft and having a spindle mounted on a rear portion thereof for rotatably supporting a wheel; and
   a plurality of links having first ends thereof coupled to said trailing arm and extending substantially transversely of said vehicle body.

2. A trailing arm suspension according to claim 1, wherein said plurality of links include first, second, and third links, said first link being pivotally supported on said trailing arm forwardly of said second pivot shaft, said second link being pivotally supported on said trailing arm forwardly and upwardly of said spindle, and said third link being pivotally supported on said trailing arm rearwardly and downwardly of said spindle.

3. A trailing arm suspension according to claim 2, including a damper having one end pivotally coupled to said third link near a portion thereof which is coupled to said trailing arm.

4. A trailing arm suspension according to claim 1, wherein said holder comprises a pair of depending members parallel to each other and extending substantially longitudinally of the vehicle body and a pair of tubular members parallel to said depending members and interconnecting ends of said depending members.

5. A trailing arm suspension according to claim 1, inculding a first rubber bushing having a first tube and interposed between said trailing arm and said second pivot shaft which extends through said first tube.

6. A trailing arm suspension according to claim 5, inculding a second rubber bushing having a second tube and interposed between said holder and said first pivot shaft which extends through said second tube.

* * * * *

UNITED STATES PATENT AND TRADEMARK OFFICE
CERTIFICATE OF CORRECTION

PATENT NO. : 4,725,073
DATED : February 16, 1988
INVENTOR(S) : Sano et al.

It is certified that error appears in the above-identified patent and that said Letters Patent is hereby corrected as shown below:

```
Column 2, line 2, delete "accompanying" (one occurence)
Column 4, line 37 (claim 5, line 2), correct the spelling
of --including--
Column 4, line 41 (claim 6, line 2), correct the spelling
of --including--
In the Abstract, line 9, change "have" to --having--
```

Signed and Sealed this

Twelfth Day of July, 1988

Attest:

DONALD J. QUIGG

*Attesting Officer*      *Commissioner of Patents and Trademarks*